E. C. HESSE.
VELOCIPEDE.
APPLICATION FILED JULY 14, 1919.
1,375,459.
Patented Apr. 19, 1921.
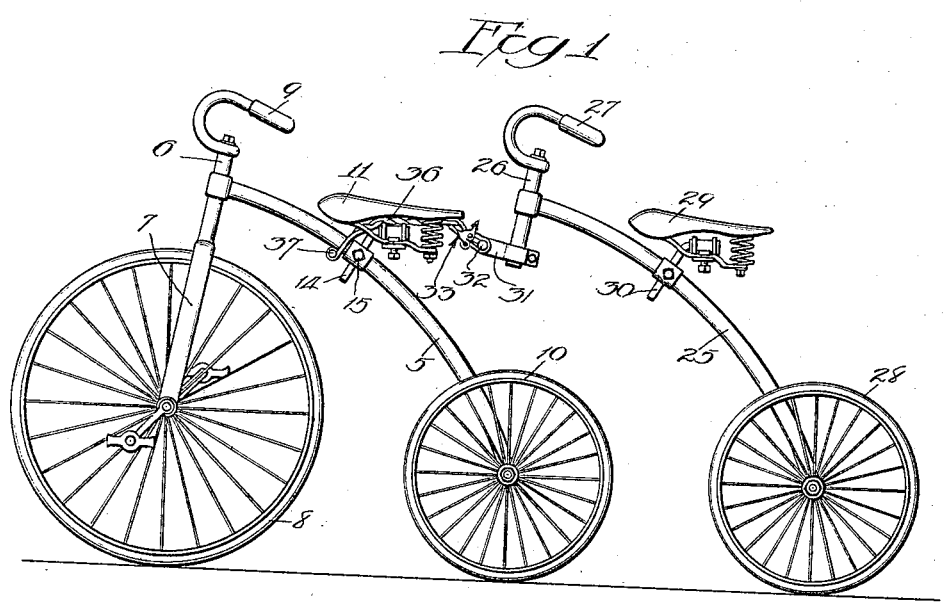
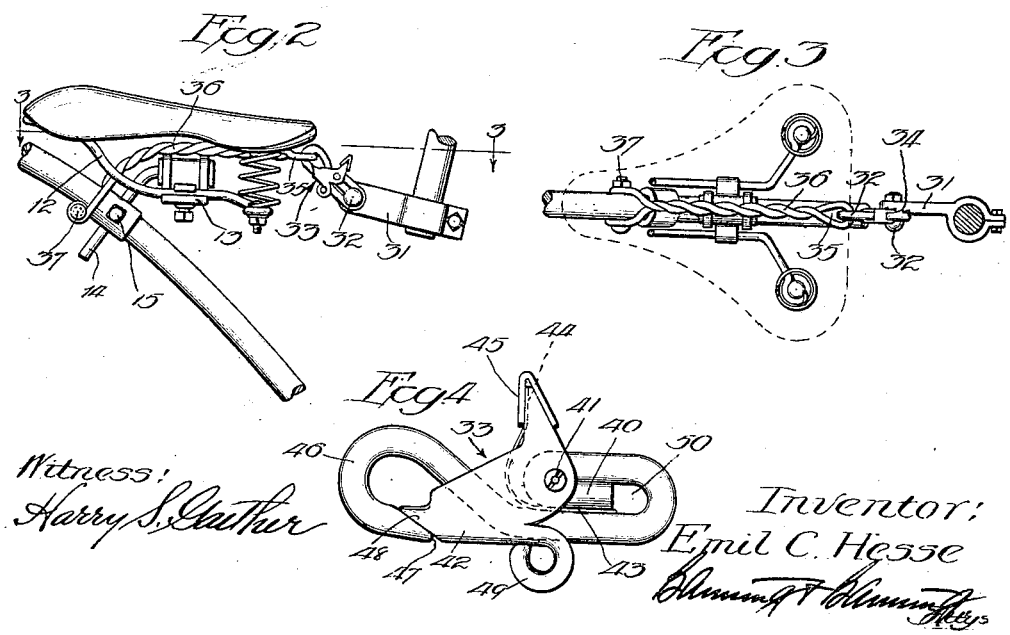
Witness: Harry S. Gaither
Inventor: Emil C. Hesse

UNITED STATES PATENT OFFICE.

EMIL C. HESSE, OF CHICAGO, ILLINOIS.

VELOCIPEDE.

1,375,459.  Specification of Letters Patent.  Patented Apr. 19, 1921.

Application filed July 14, 1919. Serial No. 310,619.

*To all whom it may concern:*

Be it known that I, EMIL C. HESSE, a citizen of the United States, residing at Chicago, in the county of Cook and State of Illinois, have invented certain new and useful Improvements in Velocipedes, of which the following is a specification.

This invention is concerned with a vehicle of the velocipede type, such as is commonly used by children; it relates more particularly to an attachment in the nature of a trailer by which the seating capacity of the vehicle is doubled.

It frequently happens that it is desirable to seat more than one child upon a vehicle of this kind, but according to present constructions this is impossible. With a view of devising a simple and inexpensive trailer which may be quickly attached, and adjusted as required, the device of the present invention has been evolved.

As a preferred construction the drawing exhibits in Figure 1 a side elevation of the vehicle in its entirety, in Fig. 2 an enlarged detail of the seat and associated parts, in Fig. 3 a sectional view on line 3—3 of Fig. 2 and in Fig. 4 a detail of the connecting hook.

The structure illustrated is of the ordinary type comprising a frame 5, tubular or otherwise, providing at its forward end a mounting for a tube 6 from which extends forks 7 between which the front wheel 8 is mounted. Handle bars 9 having operative relation to the forks, through the medium of the tube 6, enable the rider to effect steering in the usual manner. At its rear end the frame is suitably bifurcated or otherwise formed to carry an axle to which the rear wheels 10 are secured. At a suitable point upon the frame is mounted a seat 11 which, in the form shown, is stretched upon a wire frame 12 carried upon a member 13 which is clamped upon a post 14 that is held in a vertically adjustable position as by means of a bolt or set screw 15. The parts of the velocipede thus far described are common and require no further elaboration.

The trailer attachment may conveniently consist of a rear frame 25 joined at its forward end to a tube 26 upon which are carried handle bars 27. The frame 25 may be identical in all respects with the frame 5, and be formed at its rear end to support an axle for a pair of wheels 28. A seat 29 which may be the same as the seat 11 is suitably carried upon an adjustable post 30 in the manner already explained.

Between the trailer attachment and the velocipede proper a connection is arranged which may conveniently consist of an arm 31 adapted for clamping upon the tube 26, and adjustable thereupon at any desired point. Pivoted to this arm as by means of a bolt 32 is a hook 33 which will presently be described in detail. As best shown in Fig. 3, the face of the arm adjacent the hook may be serrated as at 34 so as to better maintain the hook in a given vertically angular position relative to the arm. The hook is adapted to connect with an eye 35 at the rear end of a reach 36 which is preferably disposed beneath the seat 11 so as to make connection with the frame 5 immediately forward of the post 14. This reach, in the form shown, consists of twisted rods having their forward ends each looped to provide an eye through which a bolt 37 may pass to clamp the reach in any desired position of adjustment upon the frame 5. Obviously this reach may be moved forwardly or rearwardly to a selected point should it become desirable to adjust the trailing implement closer to or farther from the velocipede.

As a suggestive form of hook 33 which is adaptable for the purposes of this invention or otherwise, I have shown in Fig. 4 a device consisting of a rod or wire having one end 40 turned upon itself to provide an opening through which a pin 41 may pass to connect with opposite sides of a rocker member 42. The wire is further bent back adjacent the end 42 in position to clamp in place a leaf spring 43 whose acting end 44 lies in abutting relation to a wall 45 of the rocker member. Continuing further the wire of this device is rounded in the form of a loop 46 and terminates as at 47, thus providing a hook which is normally closed by the acting end 48 of the rocker member under the tension of the leaf spring 43. A finger piece 49 may depend from the rocker member in the manner shown. It will be apparent that the device just described constitutes a snap hook which may be opened against the tension of the spring 43 by exerting a counter pressure upon the wall 45, thus tending to lift its end 48 from off the hook end 47. It will further be noted that at one end of the device an aperture 50 is provided for the connecting bolt 32.

According to the construction shown and described, the trailer may be constructed exactly the same as the rear part of the velocipede. All that is required for the connection between the trailer and the velocipede is the reach and clamp with snap hook pivoted thereon. When these parts have once been secured in place the device as a unit may be used with safety.

I claim:

A velocipede having a main frame at whose forward end is a generally vertical tube having connection with a steering wheel by which the velocipede is in part supported, the frame being extended both rearwardly and downwardly and providing at its rear end a mounting for a pair of wheels, a seat carried on the frame, and a trailer for the velocipede and of construction generally similar thereto, comprising a main frame at whose forward end is a generally vertical tube, a device secured to said tube and extending forwardly thereof, and a loose connection between the forward end of said device and the frame of the vehicle adapted to afford support to the forward end of the trailer, the trailer frame being extended both rearwardly and downwardly and having its rear end supported by a pair of wheels, substantially as described.

EMIL C. HESSE.

Witness:
H. OSTERTAG.